J. BROUGHTON, dec'd.,

M. BROUGHTON, administratrix.

SELF CLOSING COCK AND FAUCET.

No. 9,816. Reissued July 19, 1881.

Witnesses:-

Jno. T. Haynes

Louis M. Whitehead

Inventor:-

Mary Broughton

Administratrix of the Estate of the late John Broughton deceased by her Attorneys Brown & Brown N. PETERS, Photo-Lithographer, Washington, D. C.

UNITED STATES PATENT OFFICE.

MARY BROUGHTON, OF BROOKLYN, NEW YORK, ADMINISTRATRIX OF JOHN BROUGHTON, DECEASED.

SELF-CLOSING COCK AND FAUCET.

SPECIFICATION forming part of Reissued Letters Patent No. 9,816, dated July 19, 1881.

Original No. 212,436, dated February 18, 1879. Application for reissue filed June 3, 1881.

*To all whom it may concern:*

Be it known that JOHN BROUGHTON, of Brooklyn, in the county of Kings and State of of New York, invented certain new and useful Improvements in Self-Closing Cocks, Faucets, &c., of which the following is a specification.

The invention relates to that class of cocks and faucets in which the closing is effected by the pressure of a spring acting upon the valve as soon as the same is released from the hand after being raised.

It consists in various combinations of parts whereby the several parts of the cock or faucet are properly guided in their operation, whereby the cock or faucet may be operated by turning the key either to the right or left, and whereby economy of parts and cheapness of construction are effected.

Figure 1:
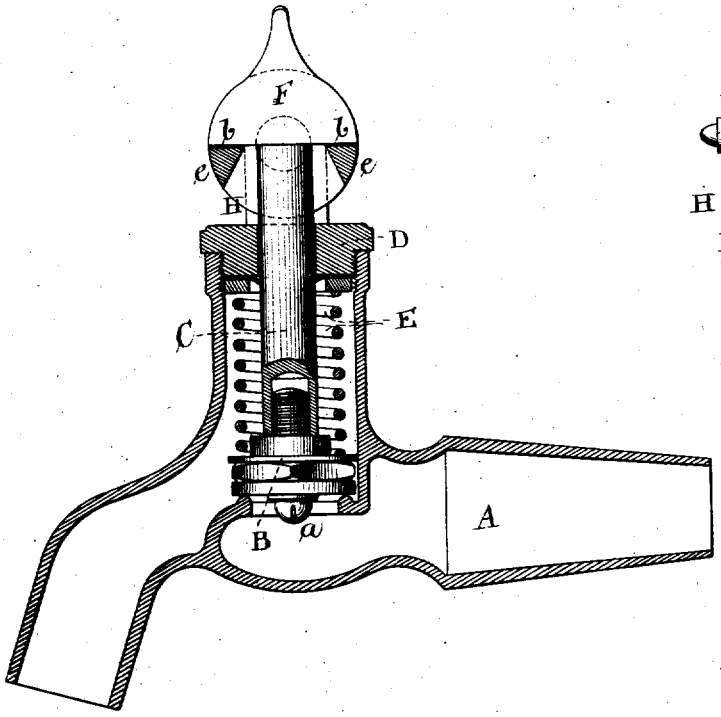
Figure 2:
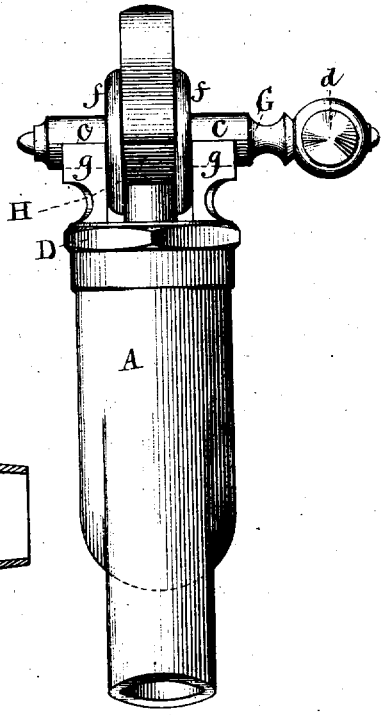
Figure 3:
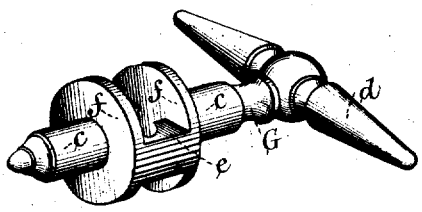

In the accompanying drawings, Figure 1 represents a central longitudinal section of a faucet embodying the improvements; Fig. 2, a front view thereof, and Fig. 3 a perspective view of the key of said faucet when detached. Similar letters of reference designate corresponding parts in all the figures.

A designates the body or shell of a cock or faucet, and *a* a port through which the water passes as it is drawn from the faucet.

B designates a disk-valve of the kind commonly employed in self-closing faucets. This valve is secured to a valve-stem, C, which passes through the bonnet or plug D in the top of the faucet. When not otherwise actuated the valve is kept tightly closed by a spring, E, (here shown as of spiral form,) coiled around the stem C, and confined between the valve B and the bonnet or plug D. The opening in the bonnet or plug D through which the stem C passes may be packed by a cup-washer, or in any suitable manner.

F designates a head, (shown as formed in one piece with the stem C,) and which comprises ears *b*, (shown as projecting from its opposite sides.)

G designates the key of the faucet, consisting of a shaft, *c*, provided at one end with a handle, *d*, whereby it may be turned.

H designates a yoke, (shown as formed in one piece with the key G,) made with an opening through which the stem C passes, and provided with lifting-pieces *e*, which act on the under side of the ears *b* to raise the valve B. The yoke H is preferably also formed with cheek-pieces *f*, (shown clearly in Fig. 3,) between which the head F fits, and by which it is properly guided in its movements. The shaft *c* of the key is arranged transversely of the valve-stem, and fits in half-round or open bearings *g*, which are shown as formed in one piece with the bonnet or plug D, and in which the key may be freely turned or oscillated. The key G is prevented from rising out of the bearings *g* by the head F on the stem C, and as said stem, when not raised by the key, is held down by the spring E, and when released is at once impelled down by said spring, it will be seen that the spring holds the key in its bearings as well as closes the valve.

The parts of this faucet are properly guided and held in position by each other, and can consequently be made cheaply and put together with very little difficulty by an inexperienced person.

Although here shown embodied in a faucet, these improvements are equally applicable to stop-valves, relief-valves, &c.

While two ears and two lifting-pieces to make the key double acting are preferable, it is practicable to use only one ear on the head of the stem and one lifting-piece on the key, in which case the key is only single acting.

What is claimed as the invention, and desired to be secured by Letters Patent, is—

1. In a self-closing cock or faucet, the combination of a valve and a valve-stem provided with a head, a key mounted in bearings transversely of said stem, and adapted when, oscillated, to act upon the said head to raise the valve-stem and open the valve, and a spring whereby said valve is held to its seat and said key is held in its bearings, substantially as specified.

2. In a self-closing cock or faucet, the combination of two ears projecting from opposite sides of the head of the valve-stem, and a yoke provided with two lifting-pieces to operate, one upon each of said ears, whereby the valve may be opened by turning the yoke either to the right or left, substantially as specified.

3. In a self-closing cock or faucet, the combination of a valve-stem provided with ears on opposite sides of its head, and a yoke having a central opening, through which said stem passes, and provided with lifting-pieces for acting on the said ears to raise the valve, substantially as specified.

4. In a self-closing cock or faucet, the combination, with a valve-stem provided with one or more ears, of a yoke provided with one or more lifting-pieces for acting on the ears to raise the valve-stem, and cheek-pieces for guiding the stem, substantially as specified.

5. In a self-closing cock or faucet, the combination of a valve-stem provided with one or more ears, a key mounted in half-round or open bearings extending from the cock or faucet, and carrying a yoke for acting upon the ear or ears to raise the valve, and a spring for closing the valve, and serving also to retain said key in its bearings, substantially as specified.

6. In a self-closing cock or faucet, the combination of the valve-stem C, spring E, head F, with its ears *b*, yoke H, with its lifting-piece *e* and cheek-pieces *f*, substantially as specified.

MARY BROUGHTON.

Witnesses:

FREDK. HAYNES,

ED. GLATZMAYER.